United States Patent [19]

Hughes

[11] Patent Number: 5,486,971
[45] Date of Patent: * Jan. 23, 1996

[54] CENTRAL HUBS FOR FLEXIBLE MAGNETIC DATA DISCS FORMED OF MAGNETICALLY SOFT POLYACETAL COMPOSITIONS

[75] Inventor: Patrick M. Hughes, Plano, Tex.

[73] Assignee: Hoechst Celanese Corporation, Somerville, N.J.

[*] Notice: The portion of the term of this patent subsequent to May 25, 2010, has been disclaimed.

[21] Appl. No.: 996,333

[22] Filed: Dec. 23, 1992

Related U.S. Application Data

[62] Division of Ser. No. 683,953, Apr. 12, 1991, Pat. No. 5,214,555.

[51] Int. Cl.$^6$ ............................................. G11B 23/03
[52] U.S. Cl. ........................................ 360/133; 360/132
[58] Field of Search ................................. 360/133, 132

[56] References Cited

U.S. PATENT DOCUMENTS

| | | | |
|---|---|---|---|
| Re. 32,781 | 11/1988 | Takahashi | 360/133 |
| 3,845,502 | 10/1974 | Paus | 360/86 |
| 4,078,246 | 3/1978 | Berthoux et al. | 360/133 |
| 4,436,201 | 3/1984 | Inaba | 206/444 |
| 4,445,155 | 4/1984 | Takahashi | 360/99.04 |
| 4,481,552 | 11/1984 | Dona et al. | 360/97.02 X |
| 4,517,617 | 5/1985 | Tsuji et al. | 360/133 |
| 4,590,532 | 5/1986 | Saito | 360/133 |
| 4,613,044 | 9/1986 | Saito et al. | 206/444 |
| 4,628,388 | 12/1986 | Kawabe | 360/128 |
| 4,630,156 | 12/1986 | Saito | 360/133 |
| 4,669,078 | 5/1987 | Ogusu | 369/291 |
| 4,686,666 | 8/1987 | Dieffenbach | 369/290 |
| 4,698,714 | 10/1987 | Sugawara et al. | 360/133 |
| 4,710,913 | 12/1987 | Matsushima et al. | 369/280 |
| 4,796,140 | 1/1989 | Wakabayashi et al. | 360/133 |
| 4,885,653 | 12/1989 | Kato | 360/133 |
| 4,903,224 | 2/1990 | Namiki et al. | 369/290 |
| 4,926,410 | 5/1990 | Suzuki et al. | 369/290 |
| 4,941,066 | 7/1990 | Swingburne et al. | 360/133 |
| 4,944,982 | 7/1990 | Kikuchi | 428/64 |
| 4,945,530 | 7/1990 | Sandell et al. | 369/291 |
| 5,121,380 | 6/1992 | Fujita et al. | 360/133 X |
| 5,214,555 | 5/1993 | Hughes | 360/133 |

FOREIGN PATENT DOCUMENTS

| | | |
|---|---|---|
| 0636866 | 8/1962 | Belgium. |
| -0114746 | 8/1984 | European Pat. Off.. |
| 0356811 | 3/1990 | European Pat. Off.. |
| 0413231 | 2/1991 | European Pat. Off.. |
| 0446708 | 9/1991 | European Pat. Off.. |

*Primary Examiner*—John H. Wolff
*Attorney, Agent, or Firm*—James M. Hunter, Jr.

[57] ABSTRACT

Flexible sheet-like magnetic discs (so-called 37 floppy discs") are provided with a central hub formed of a magnetically soft polyacetal composition. The polyacetal composition necessarily includes a polyacetal resin and elemental iron particles homogeneously dispersed throughout the polyacetal resin in an amount sufficient to impart the desired soft magnetic properties to the inherently nonmagnetic polyacetal base resin. The polyacetal compositions of this invention are injection-moldable so that central hubs for flexible magnetic discs can be rapidly and economically produced.

20 Claims, 2 Drawing Sheets

CENTRAL HUBS FOR FLEXIBLE MAGNETIC DATA DISCS FORMED OF MAGNETICALLY SOFT POLYACETAL COMPOSITIONS

This is a divisional of application Ser. No. 07/683,953 filed on Apr. 12,1991 now U.S. Pat. No. 5,214,555.

FIELD OF INVENTION

The present invention relates generally to injection moldable magnetically soft polyacetal compositions (to be defined below) which are especially useful to form the central hubs of flexible sheet-like magnetic media (e.g., so-called "floppy" data discs), and to the molded hubs formed of such polyacetal compositions.

BACKGROUND OF THE INVENTION

Flexible sheet-like magnetic discs having a nominal standardized size of about 3.5 inches are widely used in a variety of data storage/retrieval systems. For example, cassettes which include flexible magnetic discs are used in conjunction with personal computers so as to load data and/or programs into the central processing unit of the computer, as well as to store data in an off-site location in a more convenient manner.

When placed into service in a magnetic recording/reproducing apparatus, the magnetic disc (which is accommodated for rotational movement within the interior of the cassette case) is caused to spin in the desired direction and at the desired rotational velocity relative to a magnetic read/write head by means of a motor-driven spindle coacting with an aperture in the central hub of the magnetic disc. The spindle, moreover, serves to center the magnetic disc relative to the magnetic read/write head so that accurate placement and retrieval of data onto and from the disc will ensue.

The recording/reproducing apparatus will also usually include an electromagnet (usually provided integrally as part of a drive carriage which also includes the motor-driven spindle) which attracts the central hub of the data disc when in service so as to ensure positive contact with the spindle. The central hub of conventional flexible data discs must therefore necessarily be formed of a material which exhibits ferromagnetic properties—i.e., behaves ferromagnetically when exposed to a magnetizing force. Permanent magnetic material (i.e., magnetically "hard" material) would, however, detrimentally affect the magnetic data storage functions of the magnetic media associated with the data disc. For this reason, the data disc core is conventionally formed of a magnetically "soft" stainless steel.

Use of stainless steel as the central hub of a data disc, however, presents its own problems. For example, the stainless steel hub and the magnetic media (typically a circular flexible sheet of polyester coated with a magnetic film) exhibit different thermal expansion properties. There exists the possibility, therefore, that the adhesive bonding between the stainless steel hub and magnetic media may become loose due to repeated thermal expansion/contraction cycles thereby rendering the data disc unusable.

In addition, the stainless steel stock must be subjected to a number of metal-forming operations in order to achieve the necessary geometry and dimensional attributes required of a data disc hub. Exposure to repeated metal-forming operations raises the likelihood that a relatively large percentage of stainless steel central hubs will be rejected by quality control standards. That is, since each fabrication step carries with it the risk that the hub will not be formed to design standards for that particular metal-forming operation, an increase in the number of fabrication steps should likewise result in an increase in the number of rejected parts.

Recently, it has been proposed in U.S. Pat. No. 4,941,066 to Swinburne et al to form a central data disc hub by incorporating a flat stainless steel insert with a molded plastics core. The formation of the metal insert by stamping from flat metal is said to be much easier as compared to forming a conventional hub from stainless steel. The Swinburne et al '066 patent also mentions an alternative to the core/insert arrangement for their central hub. Specifically, at column 4, lines 35–43, Swinburne et al mention the possibility of forming the center core from a magnetized plastic, in which case the flat metal insert is not needed. No suggestion is made, however, of the manner in which plastics generally may be magnetized. Nor is there any suggestion that magnetized polyacetal could be employed.

SUMMARY OF THE INVENTION

According to the present invention, magnetically soft (to be defined below) polyacetal compositions are provided which are especially useful to form molded central hubs for magnetic data discs. The polyacetal compositions of this invention are rendered magnetically soft by melt-blending particles of elemental iron with a polyacetal base resin in amounts which impart the desired magnetic properties to the compositions. Preferably the iron particles will be present in the compositions of this invention in amounts in excess of about 40% by weight, and usually in amounts between about 40 to about 70% by weight (based on the total composition weight). Most preferably, the elemental iron particles will be present in the polyacetal compositions of this invention in an amount of about 50% by weight (based upon the total composition weight).

The elemental iron particles employed in the compositions of this invention may be of any desired geometric shape, provided the average particle size is between 40 to 80 mesh.

The addition of ferromagnetic materials to polyacetal is known to cause depolymerization. Surprisingly, however, it has been found that, with the addition of elemental iron particles, the magnetically soft polyacetal compositions of the present invention may be stabilized against depolymerization using conventional stabilizers in amounts conventionally employed to stabilize acetal polymers generally (i.e., acetal polymers which do not exhibit magnetic properties).

As briefly mentioned above, the elemental iron particles are melt-blended with the polyacetal base resin to make the compositions of the present invention. In this regard, conventional screw extruders (either single or double screw types) can be employed to ensure adequate and homogeneous blending of the particulate elemental iron with the polyacetal base resin. The melt-blended composition is then preferably extruded into strands, allowed to solidify and then chopped into pellets suitable for use by injection molding machinery. The central hub may thus be injection-molded using these pellets as the feed material to the injection molding machine.

Because of the significant "loading" (in terms of weight percentage) of the elemental iron particles in the polyacetal base resin in order to obtain the desired soft magnetic properties, the compositions of this invention exhibit poor melt strength. As a result, it is important that the extruded strands of magnetically soft polyacetal composition be physically supported, for example, by a conveyor or like means.

Because of the relatively low melt strengths that are attributable to the compositions of this invention, it is also important that the extruded strands be solidified as quickly as possible after being discharged from the extruder in which the components are blended. In this connection, the extruded strands are preferably passed immediately into a water quench bath. However, because the compositions of this invention contain elemental iron, care must be taken to minimize exposure of the composition to aqueous environments to thereby minimize oxidation of the elemental iron particles and the attendant discoloration of the polyacetal composition that would likely ensue. Thus, after being quenched in the water bath, the solidified strands are then passed directly to a dehumidifying oven whereby essentially all water is removed therefrom.

Central data disc hubs formed of the magnetically soft polyacetal compositions of this invention will exhibit magnetic properties that are at least comparable to conventional hubs formed of stainless steel, while at the same time offering physical properties (e.g., reduced wear) that are markedly superior to conventional stainless steel hubs. Moreover, since the compositions of this invention are injection moldable, the disadvantages associated with metal fabrication techniques are eliminated thereby potentially contributing to lesser manufacturing cost as compared to conventional stainless steel data disc hubs. And, since the data disc hubs are formed of a plastics material (polyacetal) which more nearly matches the thermal expansion properties of the polymeric magnetically coated film, separation between the data disc and the hub is less likely.

Further aspects and advantages of this invention will become more clear after careful consideration is given to the detailed description of the preferred exemplary embodiments thereof which follows.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
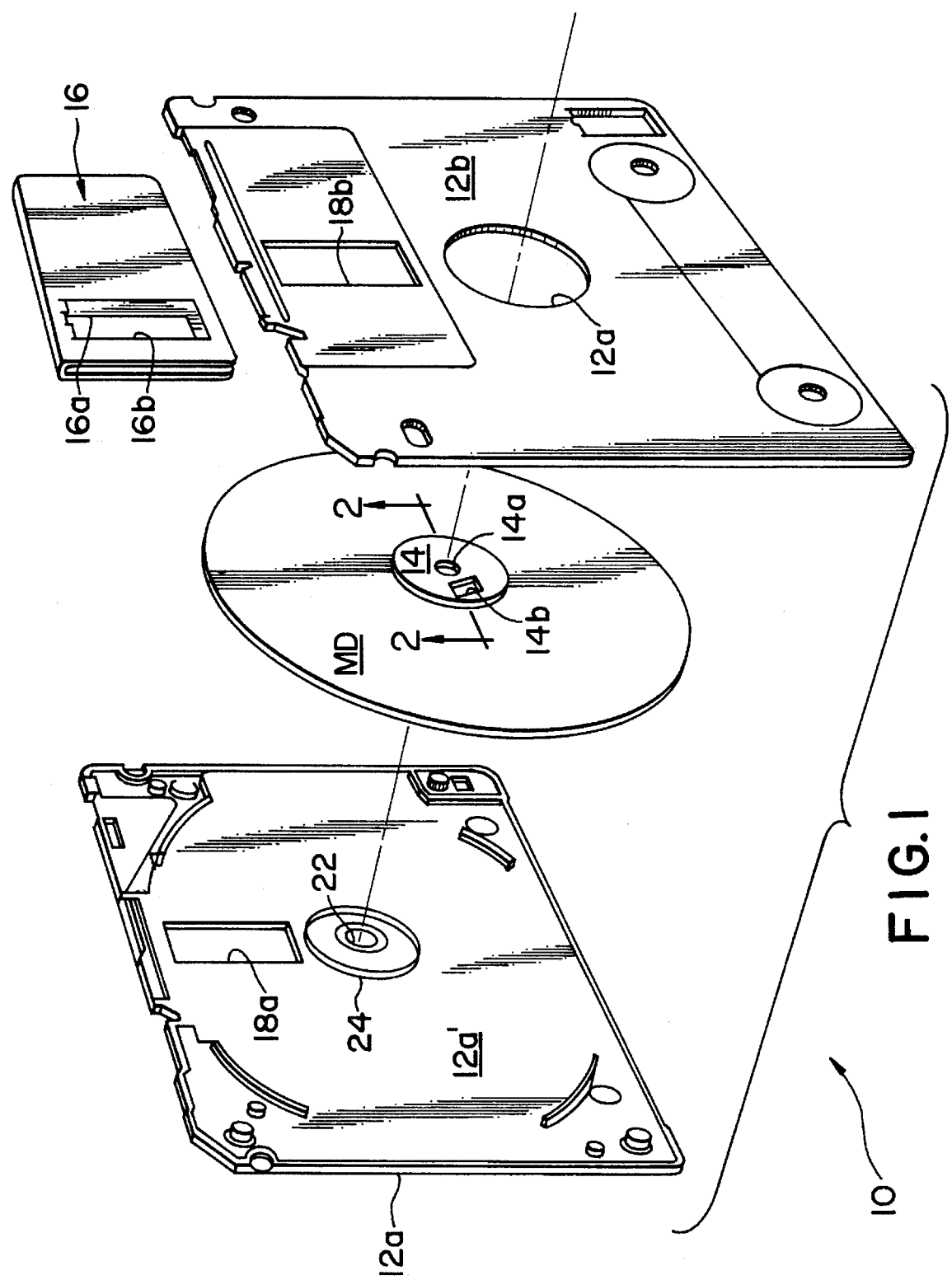
FIG. 1 is a perspective view of a flexible magnetic disc cassette according to the present invention.

Accompanying FIG. 1 shows a flexible magnetic disc cassette 10 which is configured to accept industry standard nominal 3.5-inch discs. In this regard, the cassette 10 includes a cassette case comprised of upper and lower cassette case halves 12a, 12b, respectively, joined to one another along their peripheral edges, for example. The lower cassette case half 12b defines an enlarged opening 12c which accommodates a drive carriage (not shown) associated with a conventional magnetic recording/reproducing apparatus. The drive carriage will also include a centering/drive pin (not shown) which coact with the drive aperture 14a and centering aperture 14b defined in the central hub 14 of the magnetic disc MD.

The cassette case will also have a movable shutter 16 which is biased via a spring element (not shown) in a direction whereby the shutter 16 is in a position which closes each of the access windows 18a, 18b defined in the upper and lower case halves 12a, 12b, respectively. The shutter 16 itself defines openings 16a, 16b on each of its sides which may be brought into registry with a respective one of the windows 18a, 18b when the shutter 16 is moved into its opened position against the bias force of the spring element (not shown).

Movement of the shutter 16 into its opened position typically happens automatically when the cassette 10 is inserted into the input slot of a magnetic recording/reproducing apparatus. The magnetic read/write head of such recording/reproducing apparatus may thus be brought into operative association with the magnetic disc MD by virtue of the registry of the openings 16a, 16b with a respective one of the windows 18a, 18b.

The upper cassette case half 12a is most preferably provided with an integrally molded wear button 22 which projects outwardly from the interior surface 12a'. The wear button 22 provides a low friction surface against which the terminal end of the motor-driven spindle associated with the magnetic recording/reproducing apparatus bears during operation. The most preferred integrally molded wear button 22 is described more completely in commonly owned U.S. patent application Ser. No. 650,867, filed Feb. 5, 1991 (Atty Dkt. 431-384), the entire content of which is expressly incorporated hereinto by reference.

Figure 2:
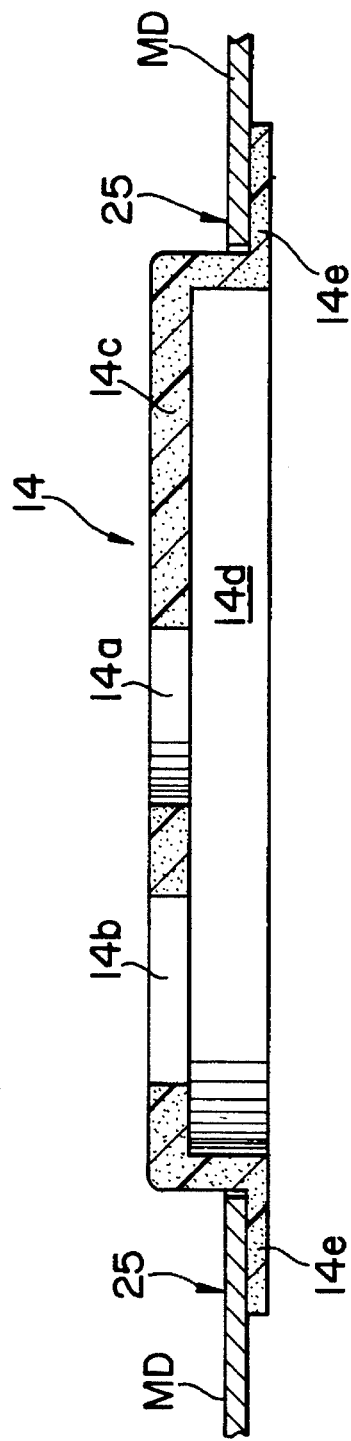
FIG. 2 is an enlarged cross-sectional view of the magnetically soft polyacetal hub employed in the magnetic disc cassette shown in FIG. 1 as taken along line 2—2 therein.

The interior surface 12a' of the upper cassette case half 12a is most preferably provided with a magnetic disc centering ring 24 integrally molded with, and protruding from, the interior surface 12a' of the upper cassette case half 12a in annular relationship to the wear button 22 as shown in accompanying FIG. 2. The centering ring 24 serves as a guide for the central hub 14 of the magnetic disc MD during use, and also prevents lateral slippage of the magnetic disc MD within the cassette case 12 (which could damage the same) during periods of nonuse.

The central hub 14 according to this invention is more clearly shown in accompanying FIG. 2. As can be seen, the hub 14 is a one-piece structure in the form of a relatively shallow inverted cup having a top wall 14c, and a cylindrical side wall 14d establishing the cross-sectional dimension of the hub 14. The centering ring 24 formed on the interior surface 12a' of the upper cassette case half 12a will therefore be sized and configured to reside closely within the interior space of the hub 14 established by the cylindrical side wall 14d. The centering ring 24 will therefore serve to prevent lateral slippage of the hub 14 within the cassette 10 thereby preventing the flexible magnetic disc MD from being damaged, particularly at its edges.

The side wall 14d of hub 14 also includes a unitary outwardly extending flange 14e which serves as a support for joining an interior annular connecting region 25 of the flexible magnetic disc MD to the hub 14. In this regard, since the flexible magnetic disc MD and the hub 14 are each formed predominantly of a plastics material, they could be joined directly to one another via heat welding or like techniques. Alternatively, the connecting region 25 of the magnetic disc MD may be joined adhesively to the flange 14e as is conventional practice.

Important to the present invention, the hub 14 is formed of a magnetically soft polyacetal composition. The term "magnetically soft" is intended to refer to the magnetic properties that are imparted to normally non-magnetic polyacetal resin which are characterized by high initial and maximum permeabilities, magnetic remanence closely approaching saturation, and small coercive force and hysteresis loss. The magnetically soft polyacetal hub will therefore be attracted to the magnetizing force of the drive carriage, for example, thereby ensuring positive contact with the central hub 14, and hence reliable transfer of rotational motion thereto.

Furthermore, by the term "magnetically soft" and like terms is meant that the polyacetal formulations of this invention exhibit magnetic properties when placed in a magnetic field but do not become permanently magnetized by that magnetic field. More specifically, the formulations of this invention exhibit a magnetic strength value (MSV) of at least 2.0 grams, when placed in a magnetic field.

The polyacetal base resin employed in the compositions of this invention are high molecular weight oxymethylene polymers having repeating oxymethylene ($—CH_2O—$) units. The oxymethylene polymers that may satisfactorily be employed according to the present invention can be either homopolymers (i.e., comprised solely of recurring oxymethylene units, exclusive of endcapping units), or copolymers (i.e., comprised mainly of recurring oxymethylene units randomly interspersed with higher oxyalkylene (preferably oxyethylene) units, exclusive of endcapping units). The preferred oxymethylene homopolymers may be made using the techniques disclosed in U.S. Pat. No. 2,768,994 to MacDonald, whereas the preferred oxymethylene copolymers may be made using the techniques disclosed in U.S. Pat. No. 3,027,352 to Walling (the entire content of each being expressly incorporated hereinto by reference).

Oxymethylene copolymers comprised mainly of recurring oxymethylene units interspersed with oxyethylene units are especially preferred. The most preferred oxymethylene copolymers are Celcon® oxymethylene copolymers commercially available from Hoechst Celanese Corporation, Engineering Plastics Division, Short Hills, N.J. Most preferred is Celcon® Grade MM3.5C polyoxymethylene copolymer.

The magnetically soft polyacetal compositions of this invention will necessarily include particulate elemental iron. Preferably, these elemental iron particles are employed in amounts no less than about 40 wt. % and no greater than about 70 wt. %, based upon the total weight of the composition. Typically, however, the elemental iron particles will be present in an amount of about 50 wt. %, based on the total composition weight. The elemental iron particles should have a particle size sufficient to pass through between nos. 40 to 80 mesh screens.

As mentioned briefly above, the inclusion of iron particles is known to cause depolymerization of polyacetal. Surprisingly, however, the compositions of this invention are stabilized against depolymerization using conventional stabilizers in amounts typically employed in stabilizing commercial grades of polyacetal resins which do not exhibit magnetic properties. In this connection, conventional stabilization "packages" that are typically employed in commercial grades of polyacetal including UV-light and/or antioxidant stabilizers may be employed in conventional amounts in the formulations of this invention.

Furthermore, other additives conventionally employed in engineering resins may be used satisfactorily in the compositions of this invention, provided that the soft magnetic properties imparted to the compositions by means of the elemental iron particles are not deleteriously affected. Thus, in addition to the UV-light and/or antioxidant stabilizers mentioned above, the compositions of this invention may contain inorganic and/or organic fillers, reinforcing agents, mold-release agents, coloring agents (e.g., dyes and/or pigments), free formaldehyde scavengers, and the like.

Figure 3:
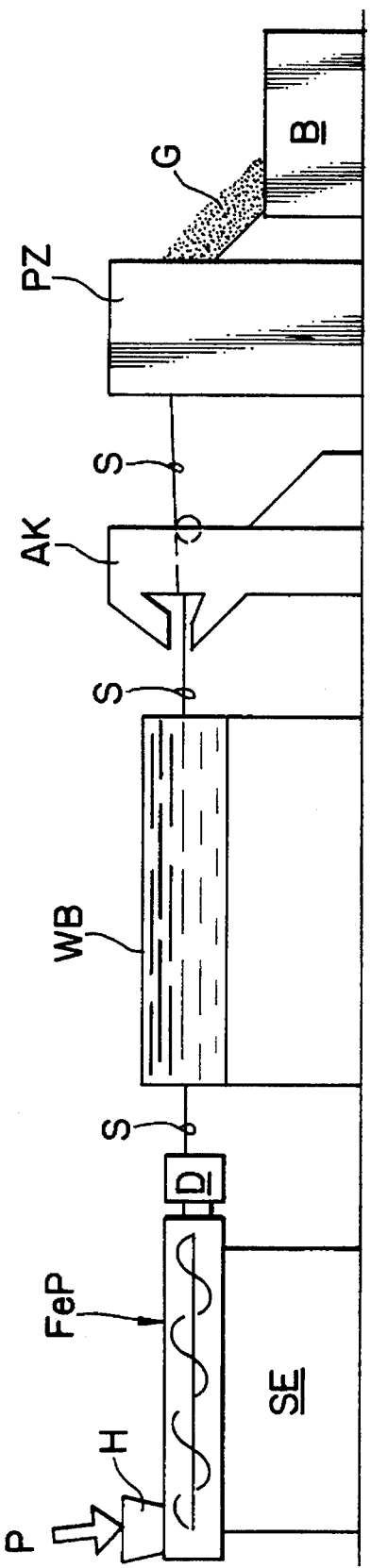
FIG. 3 is a diagrammatic representation of the processing steps employed to make the magnetically soft polyacetal compositions of this invention.

The preferred process of making the magnetically soft polyacetal compositions of this invention is shown schematically in accompanying FIG. 3. As is shown, pellets P of polyacetal base resin are fed into the hopper H of screw extruder SE. As is well known, the screw of the screw extruder SE forms a melt from the polyacetal base resin as it advances towards the discharge strand die D. Elemental iron particles FeP in the desired quantities as described above are preferably introduced into the barrel of the screw extruder SE at a downstream location between the hopper H and the die D. Alternatively, the elemental iron particles FeP may be introduced simultaneously with the polyacetal base resin in the hopper H. The iron particles FeP are thus thoroughly mixed with and thereby homogeneously dispersed throughout the melt of polyacetal resin prior to being discharged from the die D.

The die D forms at least one, and preferably several continuous strands (usually, but not necessarily, cylindrical in cross-section) of the polyacetal composition. Because the polyacetal composition exiting the die D has poor melt strength as compared to "unfilled" polyacetal compositions (compositions not having a filler material)—i.e., since the compositions of this invention are comprised of a significant amount of particulate elemental iron particles—the strands S exiting the die D must be solidified quickly. Thus, the strands S are immediately passed through a water bath WB containing water at ambient temperature (e.g., approximately 70° C.). The water in the bath WB will therefore serve to rapidly quench the strands S so as to maintain strand integrity.

As noted previously, since the polyacetal composition forming strand S includes significant amounts of elemental iron particles FeP, the residence time of the strand S in the water bath WB must be minimized. Otherwise, there is a risk that the iron particles will oxidize thereby discoloring the polyacetal base resin to unacceptable levels. Therefore, the residence time of the strand S within the water bath WB is minimized. Preferably, the strand resides in the water bath for no more than about sixty (60) seconds.

Although not absolutely required, it is preferred that the at least partially cooled and solidified polyacetal composition strands be passed through an air knife AK which directs an opposing stream of cooling air countercurrently to the direction of passage of the strands S therethrough. The air knife AK serves to provide final cooling and solidification of the strands S prior to their being introduced into pelletizer PZ where the strands are chopped into pellet-sized granules G. In addition, the air knife AK serves to blow residual water from the strand surfaces that may remain from its residence within the water bath WB.

The granules G of the polyacetal composition according to the present invention may then be collected in a bin B and dried overnight (e.g., for about 12 hours) in a conventional vacuum oven or dehumidifying oven operating at about 140° F. to further remove residual water therefrom and to thereby decrease the risk of iron particle oxidation (and polyacetal discoloration) over time. These dried granules of the polyacetal composition may thereafter be shipped to customers for use in their molding operations to produce the central hub 14 having the beneficial attributes as described above.

The following non-limiting Examples will further illustrate the present invention.

EXAMPLES

EXAMPLE I

The magnetic strength value (MSV) for compositions according to this invention were obtained using a modified Instron universal testing machine having a load range capability of between 20 to 200 grams. All MSV's were obtained using the tensile operational mode of the Instron testing machine at a test speed of 0.2 inches per minute.

A magnet obtained from a commercially available magnetic disc drive unit (i.e., a Chinon drive with a 1.44 megabyte hard disc) was rigidly affixed to the stationary Jaw of the testing machine using a small rod. Test specimens were mounted upon a 5⁄8 inch thick wooden block (approximately 6 inches by 10 inches) using double faced masking tape.

Each specimen was initially placed in face-to-face contact with the magnet so that the testing machine could be zeroed. The specimen was then retracted away from the magnet a dimension of 0.20 inch. The specimen and magnet were then moved towards one another at a speed of 0.2 inches per minute until the point at which a force in a direction opposite to the direction of movement was recorded (which occurred at approximately 0.03 inches separation distance between the magnet and the specimen), at which time the direction of movement was reversed. The specimen was then subjected to the testing procedure a second time. A trace of load versus time was recorded for each specimen using a chart speed of 0.1 inch per minute which produced four peaks for the duplicate testing procedures for each specimen tested. The MSV for each specimen tested thus represented the average of the four peaks on the trace. Five specimens for each formulation were examined with the MSV's being averaged for the specimens attributable to each formulation.

The magnetic strength value (MSV) for several formulations according to the present invention varying in elemental iron particle content from 10 wt. % to 70 wt. % using the technique described above. As a control sample, the MSV for a standard stainless steel hub taken from Sony MFD-2HD discs was also obtained. The results appear in Table I below.

TABLE I

| Sample No. | Fe Content | MSV (grams) |
| --- | --- | --- |
| 1 | 10 wt. % | 0.6 |
| 2 | 20 wt. % | 0.9 |
| 3 | 30 wt. % | 1.5 |
| 4 | 40 wt. % | 2.5 |
| 5 | 50 wt. % | 4.0 |
| 6 | 60 wt. % | 8.6 |
| 7 | 70 wt. % | 7.6 |
| Control | N/A | 17.0 |

The MSV noted above represents the first peak load on the trace for each sample which generally occurred at a separation distance of approximately 0.03 inches. A second peak was also recorded for Sample Nos. 6 and 7 (having 60 wt. % and 70 wt. % elemental iron particles, respectively) as well as the control sample when the specimen and the magnet were essentially touching. This second peak appeared to be an anomaly and was probably due to variability of results and, as such, was discounted.

EXAMPLE II

Samples Nos. 4 and 5 in Example I above were tested for efficacy in a disc drive unit. In this connection, the molded central hubs of Samples Nos. 4 and 5 were assembled with magnetic media and placed within a cassette case to form a standard 3.5-inch flexible magnetic disc cassette. The disc cassette was then inserted into the disc drive unit of an IBM PS2 personal computer, subjected to a read/write operation within the drive, and then ejected from the drive using an automated certifying apparatus having a robotic arm designed to insert and eject repeatedly a floppy disc into the drive unit. Each of the disc cassettes was subjected to a total number of 10,000 such insertion cycles. The central disc formed of the polyacetal compositions of this invention exhibited sufficient magnetic strength to achieve satisfactory reading/writing of data onto the magnetic media during each of the 10,000 insertion cycles. In addition, neither hub showed any decrease in magnetic strength or any surface wear at the end of the 10,000 cycles. In contrast, a conventional stainless steel hub similarly subjected to 10,000 insertion cycles exhibited noticeable surface wear indicating that fine stainless steel particles were perhaps released within the disc drive unit.

EXAMPLE III

An iron-loaded polyacetal composition was prepared by blending 50 wt. % of elemental iron particles having an average particle size of about of between about 40 to about 80 mesh screen (U.S. Standard Mesh in a conventional screw extruder operating at average barrel temperature of about 375° F. In this connection, the iron particles used in this Example III were commercially obtained from the Hoeganaes Corporation of Riverton, N.J. and identified as M2080 iron particles. The iron-loaded polyacetal composition was extruded through a die maintained at a temperature of about 375° F. to form strands. These extruded strands were then immediately introduced through a quench bath containing room temperature (70°–75° F.) water. The quench bath was three (3) feet in length so that the strand residence time in the quench bath was only approximately 30 seconds. These quenched strands were then sent to a pelletizer where the strands were chopped into pellets. The pellets were collected and dried overnight in a dehumidifying oven to prevent discoloration of the composition due to oxidation of the elemental iron.

EXAMPLE IV

The composition of EXAMPLE III was molded into two (2) flat test bars (identified as B1 and B2) approximately ½ inches wide×4⅞ inches long×⅛ inch thick and subjected to magnetic field testing to determine whether the composition exhibits "soft" magnetic properties. Initial magnetization readings at several locations along the top and bottom surfaces for each of the test bars were obtained using a Gaussmeter (F. W. Bell Model 615). These initial magnetization readings appear in Table 2a below. The B1 test bar was then magnetized repeatedly using magnetizing apparatus (F. W. Bell Model 861A with model 8626A basic magnetizer) set at a capacitor voltage of 350 volts. After each magnetization cycle, the B1 test bar was examined for magnetization properties at several locations along one of its surfaces using the same Gaussmeter as was used for the initial magnetization examination. The lowest and highest magnetization noted after each magnetization cycle appears in Table 2b below.

TABLE 2a

Initial Magnetization

Gauss Readings - Top Surface

| Test Bar | No. 1 | No. 2 | No. 3 |
| --- | --- | --- | --- |
| B1 | .000 | +.001 | −.003 |
| B2 | .000 | −.002 | .000 |

Gauss Readings - Bottom Surface

| Test Bar | No. 1 | No. 2 | No. 3 | No. 4 | No. 5 |
| --- | --- | --- | --- | --- | --- |
| B1 | +.002 | +.001 | −.002 | −.001 | −.002 |
| B2 | .000 | .000 | .000 | .000 | −.003 |

TABLE 2b

Magnetization After Magnetization Cycles

Gauss Readings - Test Bar B2 Surface Locations

| Cycle | No. 1 | No. 2 | No. 3 | No. 4 | No. 5 |
| --- | --- | --- | --- | --- | --- |
| 1 | −.002 | −.003 | +.001 | −.004 | +.003 |
| 2 | +.001 | −.003 | +.004 | −.005 | +.004 |
| 3 | .000 | −.004 | +.004 | −.002 | +.001 |
| 4 | −.001 | −.004 | +.001 | .000 | .000 |
| 5 | −.002 | .000 | +.004 | −.005 | +.003 |
| 6 | .000 | +.002 | +.003 | −.004 | +.003 |
| 7 | .000 | +.001 | +.002 | −.003 | +.002 |

The above data show that the polyacetal compositions of this invention exhibit "soft" magnetic properties since repeated exposure to magnetic fields does not cause any meaningful increase in the magnetization properties. In addition, the data after repeated magnetization are comparable to the initial magnetization properties which further indicates that no permanent magnetization of the polyacetal compositions of this invention ensue.

Although the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An injection-moldable polyacetal resin composition having soft magnetic properties characterized by high initial and maximum permeabilities, magnetic remanence closely approaching saturation, and small coercive force and hysteresis loss, said composition consisting essentially of a polyacetal base resin, and at least about 40% by weight, based on the total composition weight, of elemental iron particles wherein the iron particles are homogeneously dispersed through the resin to impart magnetically soft properties to the composition.

2. A composition as in claim 1, wherein said polyacetal resin is selected from oxymethylene homopolymers and oxymethylene copolymers.

3. A composition as in claim 1, wherein said polyacetal resin is a polyoxymethylene copolymer consisting essentially of repeating oxymethylene units interspersed randomly with higher oxyalkylene units.

4. A composition as in claim 3, wherein said higher oxyalkylene units are oxyethylene units.

5. The composition according to claim 4 wherein the amount of elemental iron particles is from about 40% to about 70% by weight, based on the total weight of the composition.

6. The composition according to claim 5 wherein the amount of elemental iron particles is about 50% by weight, based on the total weight of the composition.

7. The composition according to claim 6 wherein the average size of elemental iron particles is from 40 to 80 mesh.

8. The composition according to claim 7 further containing a stabilizer selected from the group consisting of UV-light stabilizers, antioxidant, and mixtures thereof.

9. The composition according to claim 8 further containing additives selected from the group consisting of organic and inorganic fillers, reinforcing agents, mold-release agents, dyes and pigments, formaldehyde scavengers, and mixtures thereof.

10. A magnetically soft central hub for a flexible, magnetic disc cassette prepared from the composition according to claim 9.

11. An injection moldable, magnetically sensitive polyacetal resin composition having soft magnetic properties characterized by high initial and maximum permeabilities, magnetic remanence closely approaching saturation, and small coercive force and hysteresis loss, consisting essentially of a melt blend of polyacetal resin and at least about 40% by weight of elemental iron particles having a particle size from 40 to 80 mesh, wherein the iron particles are homogeneously dispersed through the resin to impart magnetically soft properties to the composition.

12. The composition according to claim 11 wherein said polyacetal resin consists of high molecular weight units selected from oxymethylene homopolymers and oxymethylene copolymers.

13. The composition according to claim 12 wherein said polyacetal resin is an oxymethylene copolymer consisting essentially of repeating oxymethylene units interspersed randomly with higher oxyalkylene units.

14. The composition according to claim 13 wherein said higher oxyalkylene units are oxyethylene units.

15. The composition according to claim 14 wherein said elemental iron particles are present in an amount from about 40% to about 70% by weight, based on the total weight of the composition.

16. The composition according to claim 15 wherein said elemental iron particles are present in an amount of about 50% by weight, based on the total weight of the composition.

17. The composition according to claim 16 further containing a stabilizer selected from the group consisting of UV-light stabilizers, antioxidant, and mixtures thereof.

18. The composition according to claim 17 further containing additives selected from the group consisting of organic and inorganic fillers, reinforcing agents, mold-release agents, dyes and pigments, formaldehyde scavengers, and mixtures thereof.

19. A magnetically soft central hub for a flexible magnetic data disc prepared from the composition according to claim 18.

20. An injection moldable, magnetically sensitive polyacetal resin composition, consisting essentially of a melt blend of polyacetal resin and from about 40% to about 70% by weight, based on the total weight of the composition, of elemental iron particles having an average particle size from 40 to 80 mesh wherein the iron particles are homogeneously dispersed through the resin to impart magnetically soft properties to the composition and wherein said polyacetal resin is selected from oxymethylene homopolymers and oxymethylene copolymers wherein the oxymethylene copolymer consisting essentially of repeating oxymethylene units interspersed randomly with higher oxyalkylene units.

* * * * *